(12) United States Patent
Seo et al.

(10) Patent No.: US 7,460,600 B2
(45) Date of Patent: Dec. 2, 2008

(54) MPEG VIDEO DECODING SYSTEM

(75) Inventors: Byeong Chan Seo, Seoul (KR); Eung Tae Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 976 days.

(21) Appl. No.: 10/725,545

(22) Filed: Dec. 3, 2003

(65) Prior Publication Data

US 2004/0109504 A1    Jun. 10, 2004

(30) Foreign Application Priority Data

Dec. 4, 2002    (KR) .................. 10-2002-0076652

(51) Int. Cl.
*H04N 7/18*    (2006.01)
(52) U.S. Cl. .................. 375/240.25; 375/240.18; 375/240.19
(58) Field of Classification Search .................. 375/240.01–240.29
See application file for complete search history.

(56) References Cited

U.S. PATENT DOCUMENTS

| | | | | |
|---|---|---|---|---|
| 6,295,320 | B1 * | 9/2001 | Lim et al. .................. | 375/240.2 |
| 6,389,171 | B1 * | 5/2002 | Washington .................. | 382/233 |
| 6,618,442 | B1 * | 9/2003 | Chen et al. .................. | 375/240.2 |
| 6,741,292 | B1 * | 5/2004 | Shen et al. .................. | 348/553 |
| 6,944,226 | B1 * | 9/2005 | Lin et al. .................. | 375/240.2 |
| 7,012,961 | B2 * | 3/2006 | Rhee et al. .................. | 375/240.25 |
| 7,136,417 | B2 * | 11/2006 | Rodriguez .................. | 375/240.29 |
| 2004/0086000 | A1 * | 5/2004 | Wallace et al. .................. | 370/503 |

* cited by examiner

*Primary Examiner*—Andy S Rao
(74) *Attorney, Agent, or Firm*—Birch, Stewart Kolasch & Birch, LLP

(57) ABSTRACT

An MPEG video decoding system including: a buffer for storing an MPEG-formatted or a DV-formatted video signal; a VLD/IQ unit for performing a variable length decoding and an inverse quantization of the video signal; an IDCT device for selectively performing an 8×8 IDCT and a 4×8 IDCT according to the format of the inversely quantized signal; an adder for bypassing and storing the output signal of the IDCT unit into an external memory if the output signal of the IDCT unit is an MPEG-formatted I-picture or a DV format, and for adding the IDCT-ed signal and a motion compensated signal if the output signal of the IDCT device is an MPEG-formatted P-picture or B-picture; and a motion compensator for performing a motion compensation outputting the motion compensated signal to the adder, if the output signal of the IDCT device is the MPEG-formatted P-picture or the MPEG-formatted B-picture.

15 Claims, 8 Drawing Sheets

525-60 system 625-50 system

MPEG VIDEO DECODING SYSTEM

This application claims the benefit of the Korean Application No. P2002-76652 filed on Dec. 4, 2002, which is hereby incorporated by reference.

BACKGROUND OF THE INVENTION

1. Field of the Invention

The present invention relates to a MPEG video decoding system, and more particularly, to a MPEG video which is capable of supporting a digital video format.

2. Discussion of the Related Art

FIG. 1 is a block diagram of a general Moving Picture Experts Group-2 (MPEG-2) video decoding system. Referring to FIG. 1, the MPEG system decoding system includes an MPEG system decoder 101, a video decoder 102, a video display processor (VDP) 103, an audio decoder 104, a memory interface 105, and a host interface 106. Further, an external DRAM memory is connected to the memory interface 105. The external DRAM memory stores input bitstreams and frame-buffers for motion compensation. In order to support an MP@HL mode in MPEG-2 standard as shown in FIG. 1, bit-buffer size of about 10 Mbits is required and a maximum allowable bit rate reaches about 80 Mbit/s.

Meanwhile, digital TVs (DTVs) employing the MPEG video decoding system of FIG. 1 support a variety of functions, mainly a picture in picture (PIP) function till now. The DTVs are limited in a form of DTV+NTSC or DTV+PC external input.

Recently, a high-end DTV is equipped with an IEEE-1394 interface unit and there is a tendency to manufacture a product that transmits/receives data at a high speed. As an example of application products, a product connected to a digital camcorder through IEEE-1394 is available. The product improves a degradation of a picture quality, which is caused when a general TV and a digital camcorder are connected to each other through a conventional analog interface. Therefore, the product can obtain a good picture quality because data is transmitted/received between the DTV and the digital camcorder in a digital format.

A conventional high-end DTV must use chips that are configured with an IEEE-1394 transceiver, a format decoder for digital video (DV) format as a standard format recorded in a digital camcorder, and an MPEG-2 video decoder. In other words, since a conventional video decoding chip includes the MPEG-2 video decoder and the DV decoder for the MPEG video and the DV format, gate size, memory and chip cost are increased, resulting in an increase of cost.

Accordingly, there is a demand for a development of an efficient video decoding chip which is capable of supporting both the high definition (HD) video signal decoder and the DV format decoder, considering a limitation of memory, chip size and bandwidth of data bus.

SUMMARY OF THE INVENTION

Accordingly, the present invention is directed to an MPEG video decoding system that substantially obviates one or more problems due to limitations and disadvantages of the related art.

An object of the present invention is to provide an MPEG video decoding system, in which one video decoder decodes both an SD DV format signal and an HD MPEG-2 sequence.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an MPEG video decoding system including a memory interface for controlling data input/output between a video decoder and an external memory, comprises: an MPEG system decoder for dividing an external input MPEG bitstream into a video bitstream and an audio bitstream; a DV system decoder for converting an external input DV formatted signal into a DIF signal and dividing the DIF signal into a video DIF and an audio DIF; a single combined DV/MPEG video decoder for sharing a plurality of internal blocks to decode both the MPEG video signal outputted from the MPEG system decoder and the video DIF signal outputted from the DV system decoder and storing the decoded data into the external memory; and a format converter for performing a format conversion to a color difference signal, the color difference signal being a signal that is video-decoded by the combined DV/MPEG video decoder and outputted through the external memory.

The combined DV/MPEG video decoder includes: a buffer for temporarily storing a video signal outputted from one of the MPEG system decoder and the DV system decoder; a VLD/IQ means for performing a variable length decoding and an inverse quantization to the video signal outputted from the buffer; an IDCT means for performing an 8×8 IDCT if the inversely quantized signal is an MPEG format or 625-50 DV format, and performing one of an 8×8 IDCT and an 4×8 IDCT according to a DCT type if the inversely quantized signal is a 525-60 DV format; an adder for bypassing and storing the output signal of the IDCT means into an external memory if the output signal of the IDCT means is an MPEG-formatted I-picture or a DV format, and adding the IDCT-ed signal and a motion compensated signal and storing the added signal into the external memory if the output signal of the IDCT means is an MPEG-formatted P-picture or an MPEG-formatted B-picture; and a motion compensator for performing a motion compensation by using a motion information and a previous frame stored in the external memory and outputting the motion compensated signal to the adder if the output signal of the IDCT means is the MPEG-formatted P-picture or the MPEG-formatted B-picture.

The IDCT means includes: a horizontal 8×1 IDCT unit for performing an 8×1 IDCT to the inversely quantized video signal in a horizontal direction; a transverse buffer for performing a horizontal-vertical transposition to the horizontally IDCT-ed signal; a switching unit for controlling an output path of the signal outputted from the transverse buffer according to the format type of an inputted signal; a vertical 8×1 IDCT unit for performing an 8×1 IDCT to the output signal of the switching unit in a vertical direction; and a vertical 4×1 IDCT unit for performing a 4×1 IDCT to the output signal of the switching unit in a vertical direction.

If the format type of the inputted signal is the MPEG format, a vertical frame DCT of 625-50 DV format and the vertical frame DCT of 525-60 DV format, the switching unit outputs an output signal of the transverse buffer to the 8×1 IDCT unit, and if the format type of the inputted signal is a vertical field DCT of 525-60 DV format, the switching unit outputs the output signal of the transverse buffer to the 4×1 IDCT.

Further, the format converter converts a video-decoded 4:2:0 color difference signal into a 4:2:2 color difference signal if the video-decoded signal is the MPEG format or a 625-50 DV format, and converts a video-decoded 4:1:1 color difference signal into a 4:2:2 color difference signal if the video-decoded signal is a 525-60 DV format.

If the video-decoded signal is a 525-60 DV format, the de-shuffler outputs the video-decoded signal by supper block unit consisting of a plurality of macro blocks, performs a de-shuffling to the video-decoded signal in order to reconfigure an original screen, and stores the de-shuffled signal into the external memory.

According to the present invention, an MPEG video decoding system comprises: a buffer for storing an MPEG-formatted video signal or a DV-formatted video signal; a VLD/IQ means for performing a variable length decoding and an inverse quantization to the video signal outputted from the buffer; an IDCT means for selectively performing an 8×8 IDCT and a 4×8 IDCT according to the format of the inversely quantized signal; an adder for bypassing and storing the output signal of the IDCT means into an external memory if the output signal of the IDCT means is an MPEG-formatted I-picture or a DV format, and for adding the IDCT-ed signal and a motion compensated signal and storing the added signal into the external memory if the output signal of the IDCT means is an MPEG-formatted P-picture or an MPEG-formatted B-picture; and a motion compensator for performing a motion compensation by using a motion information and a previous frame stored in the external memory and outputting the motion compensated signal to the adder, if the output signal of the IDCT means is the MPEG-formatted P-picture or the MPEG-formatted B-picture.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention to achieve the objects, with examples of which are illustrated in the accompanying drawings. Wherever possible, the same reference numbers will be used throughout the drawings to refer to the same or like parts.

Figure 1:
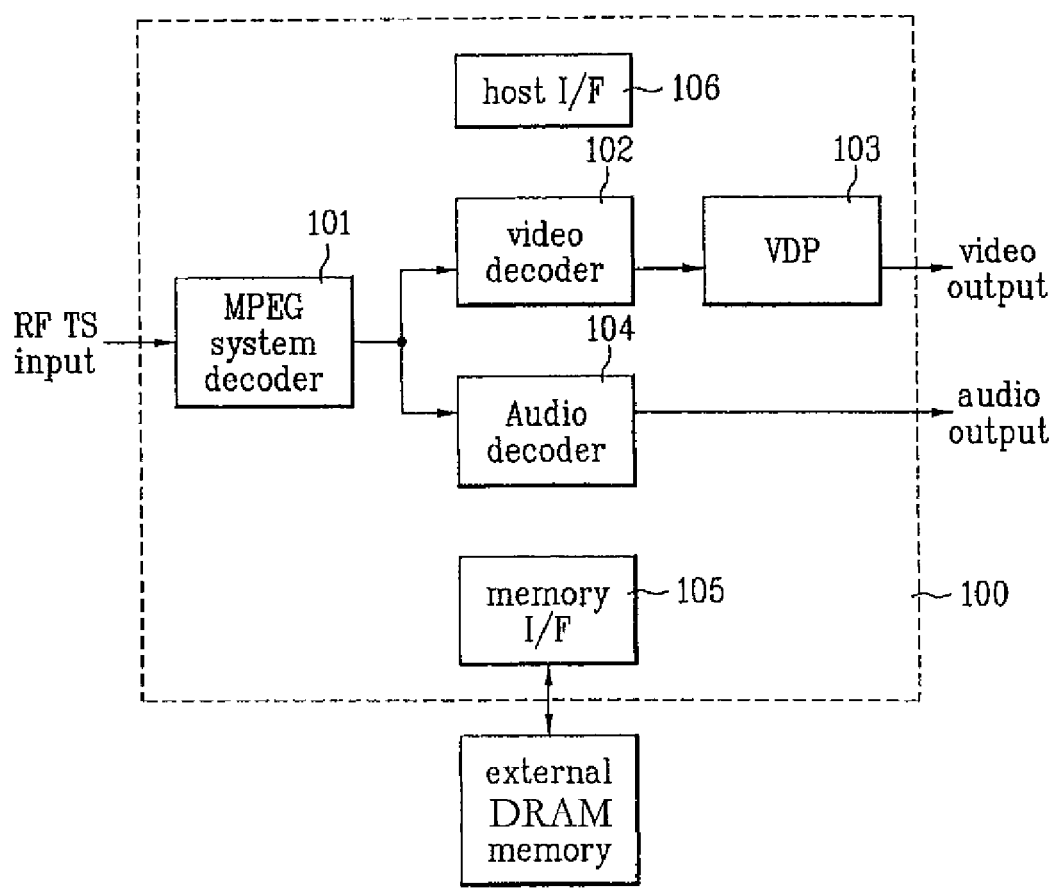
FIG. 1 is a block diagram of a conventional MPEG decoding system.
Figure 2:
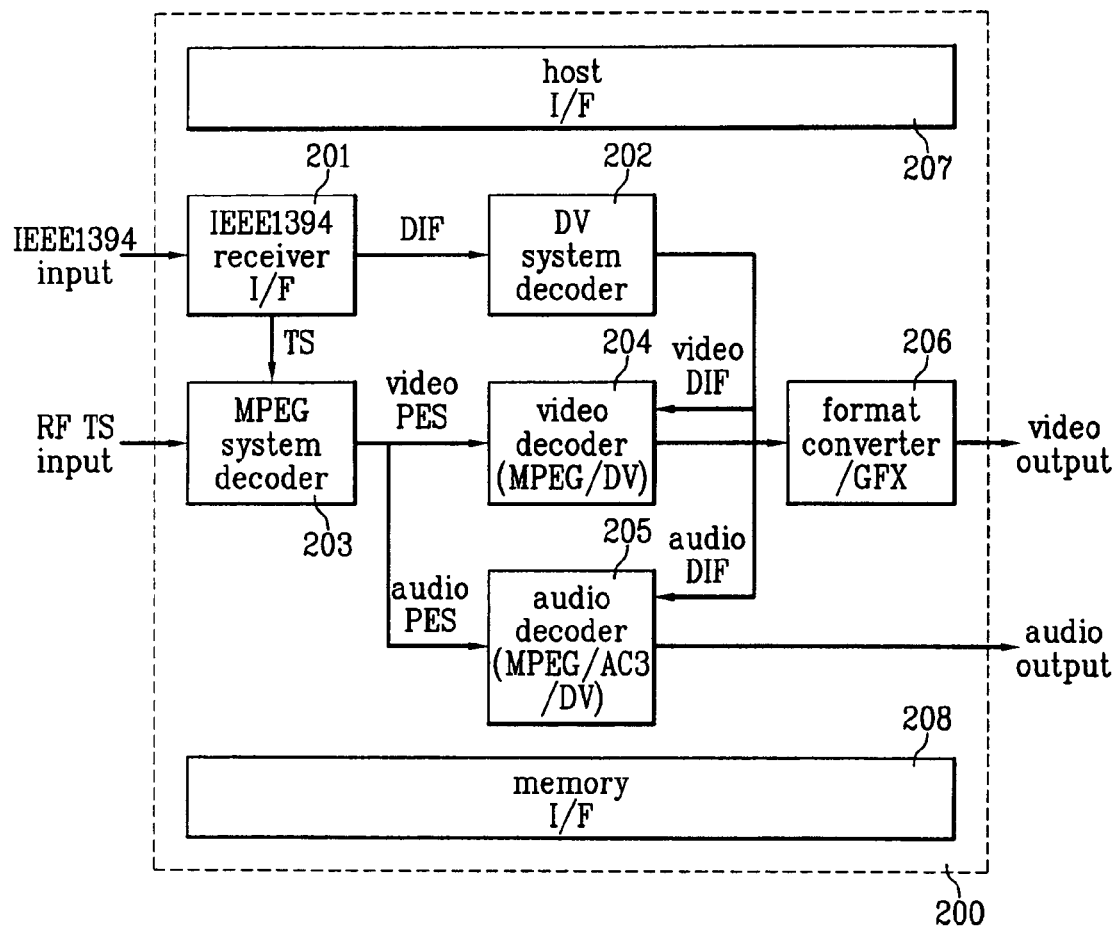
FIG. 2 is a block diagram of a video decoding system supporting a DV format according to the present invention.

FIG. 2 is a block diagram of a video decoding system supporting a digital video (DV) format according to the present invention. One video decoder 204 decodes both an SD DV video signal and an HD MPEG video signal.

Referring to FIG. 2, the MPEG video decoding system 200 includes: an IEEE-1394 receiver interface 201 for converting a DV signal into a DIF signal; a DV system decoder 202 for dividing the DIF signal into a video DIF and an audio DIF; an MPEG system decoder 203 for dividing an RF transport bitstream into a video PES and an audio PES; a combined DV/MPEG video decoder 204 for receiving the video DIF from the DV system decoder 202 or the video PES from the MPEG system decoder 203 and performing a video decoding; a combined DV/MPEG audio decoder 205 for receiving the audio DIF from the DV system decoder 202 or the audio PES from the MPEG system decoder 203 and performing an audio decoding; a format converter 206 for converting a format of the video signal decoded by the combined DV/MPEG video decoder 204; a host interface 207; and a memory interface 208.

Here, the MPEG video decoding system 200 can be implemented with one chip. There are two input paths in the chip 200. One is a transport (TS) bitstream signal path in which a signal is inputted to the MPEG system decoder 203 through a TV tuner and a decoder, and the other is an IEEE-1394 signal (i.e., DV signal) path in which a signal is inputted to the IEEE-1394 reception interface 201 through an IEEE-1394 port.

The MPEG system decoder 203 divides the inputted TS bitstream into the video bitstream and the audio bitstream. The video bitstream and the audio bitstream are outputted to the combined DV/MPEG video decoder 204 and the combined DV/MPEG audio decoder 205, respectively. Here, The TS bitstream inputted to the MPEG system decoder 203 is an elementary stream (ES), and the video and audio bitstreams outputted from the MPEG system decoder 203 are a packetized elementary stream (PES).

The IEEE-1394 receiver interface 201 converts the DV signal into a digital interface format (DIF) and outputs the DIF to the DV system decoder 202. The DV system decoder 202 divides the video DIF into the video DIF and the audio DIF. The video DIF and audio DIF are outputted to the combined DV/MPEG video decoder 204 and the combined DV/MPEG audio decoder 205, respectively.

The combined DV/MPEG video decoder 204 shares a plurality of internal blocks and decodes the video PES or the video DIF.

Figure 3:
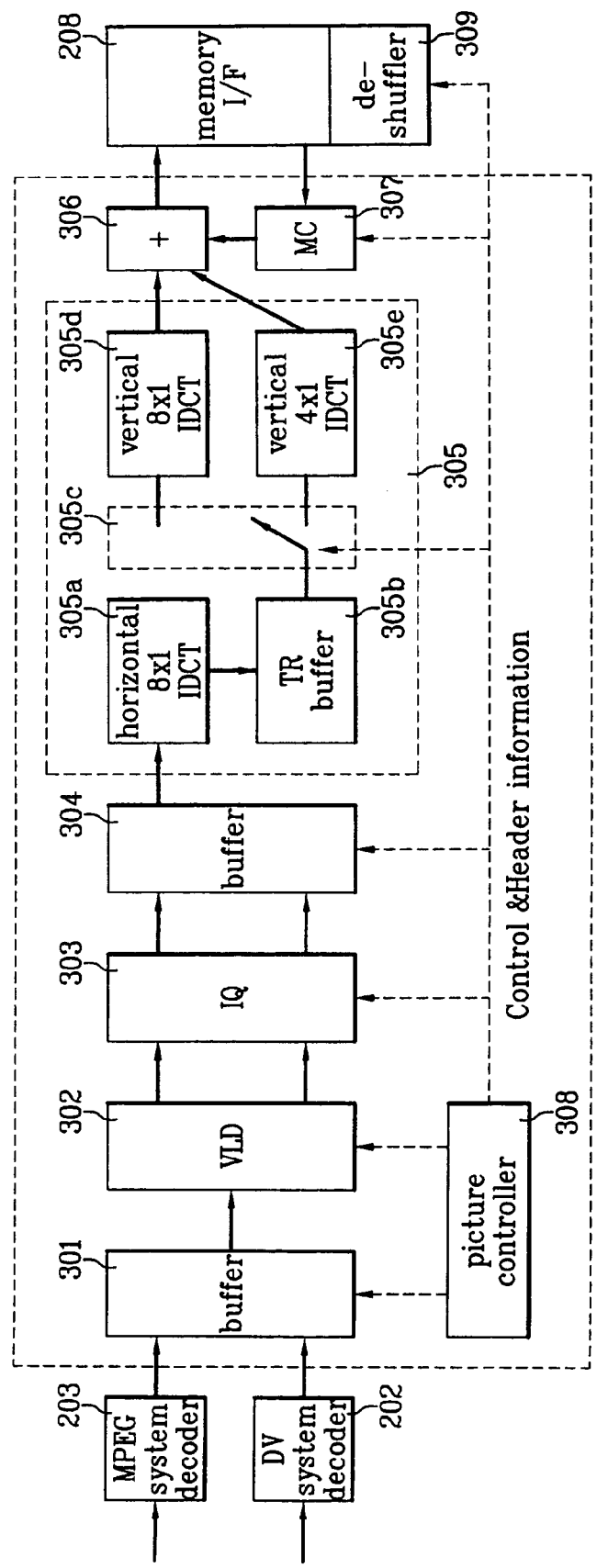
FIG. 3 is a detailed block diagram of the combined DV/MPEG video decoder shown in FIG. 2.

FIG. 3 is a detailed block diagram of the combined DV/MPEG video decoder 204. As shown, the combined DV/MPEG video decoder 204 includes a buffer 301, a variable length decoder (VLD) 302, an inverse quantizer (IQ) 303, a buffer 304, an inverse discrete cosine transform (IDCT) unit 305, an adder 306, a motion compensation (MC) unit 307, and a picture controller 308. Here, the memory interface 208 includes a de-shuffler 309 for DV format image.

Referring to FIG. 3, a buffer size is reduced because the combined DV/MPEG video decoder 204 shares the buffer 301 efficiently. Further, a gate size is reduced because the DV/MPEG video decoder 204 shares the VLD 302, the IQ 303, the IDCT unit 305, the picture controller 308 and the memory interface 208 and because a small number of gates are added.

Here, the IDCT unit 305 includes horizontal 8×1 IDCT 305a, a transverse buffer 305b, a switching unit 305c, a vertical 8×1 IDCT 305*d*, and a vertical 4×1 IDCT 305*e*. The switching unit 305*c*, the vertical 4×1 IDCT 305*e* and the de-shuffler 309 are provided for DV 525-60 format.

Figure 4A:
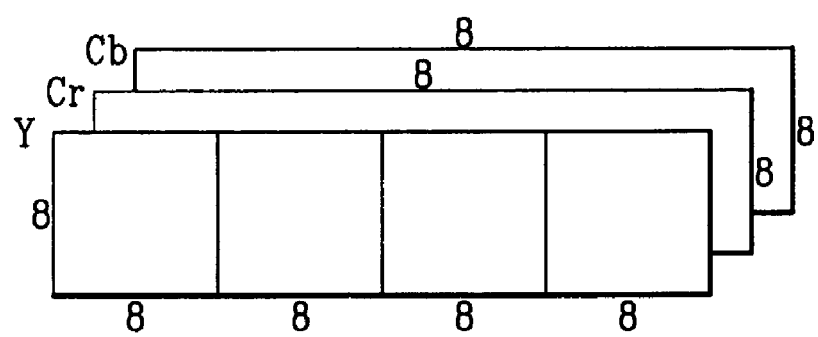
FIG. 4A exemplarily shows a macro block type of a DV 525-60 system.
Figure 4B:
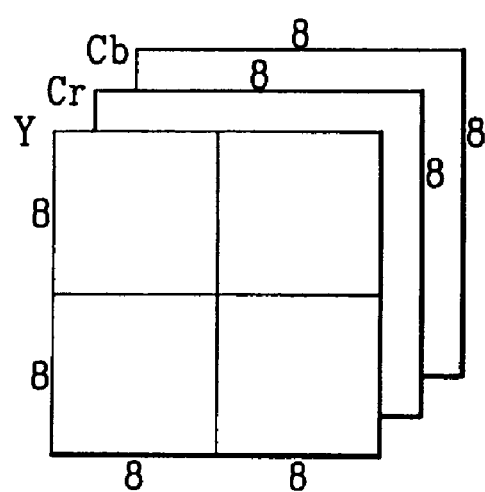
FIG. 4B exemplarily shows a macro block type of a DV 625-50 system.

The DV format is classified into a 525-60 system DV format and a 625-50 system DV format, as shown in FIGS. 4A and 4B.

In the DV format, sampled video data are also processed by macro block unit. As shown in FIG. 4A, in case the macro block is the 525-60 DV format, the 525-60 DV format is configured with four luminance blocks adjacent to each other in a horizontal direction and two color difference (Cb, Cr) blocks. On the contrary, as shown in FIG. 4B, the 625-50 DV format is configured with four luminance blocks adjacent to each other in horizontal and vertical directions and two color difference (Cr, Cb) blocks. The 625-50 DV format is almost similar to the MPEG video format.

Accordingly, the horizontal 8×1 IDCT unit 305*a*, the transverse buffer 305*b*, the switching unit 305*c*, the vertical 8×1 IDCT 305*d* and the vertical 4×1 IDCT 305*e* are provided for supporting both a 4×8 IDCT with respect to a field DCT and an 8×8 IDCT with respect to a frame DCT in the macro block of the 525-60 DV format.

In other words, if the output signal of the buffer 304 is the MPEG video signal or 625-50 DV format, the horizontally 8×1 IDCT-ed result of the horizontal IDCT unit 305 is horizontal-vertical (H-V) transposed in the transverse buffer 305*b*. Then, the H-V transposed signal is inputted to the vertical 8×1 IDCT unit 305*d* through the switching unit 305*c* and is then 8×1 IDCT-ed in a vertical direction. Meanwhile, the output signal of the buffer 304 is the 525-60 DV format, the vertical IDCT unit is determined according to a vertical field DCT and a vertical frame DCT. For example, if the signal is the vertical field DCT, an output of the transverse buffer 305*b* is transferred to the vertical 4×1 IDCT 305*e* by a switching operation of the switching unit 305*e*. As a result, the resulting signal is 4×1 IDCT-ed in a vertical direction. If the signal is the frame DCT, the signal is outputted to the vertical 8×1 IDCT 305*d* and is then 8×1 IDCT-ed in a vertical direction.

Herein, the combined DV/MPEG video decoder 204 constructed as above will be described below in detail.

The video PES signal outputted from the MPEG system decoder 203 is inputted to the VLD 302 through the buffer 301 of the combined DV/MPEG video decoder 204. The VLD 302 performs the variable length decoding to the output signal of the buffer 301. Then, the IQ 303 inversely quantizes the output of the VLD 302. The inversely quantized MPEG video signal is transferred to the horizontal 8×1 IDCT 305*a* of the IDCT unit 305 through the buffer 304. The horizontal 8×1 IDCT unit 305*a* performs the 8×1 IDCT to the inversely quantized MPEG video signal in a horizontal direction. Then, the output signal of the horizontal 8×1 IDCT unit 305*a* is H-V transposed in the transverse buffer 305*b* and then transferred to the switching unit 305*c*. The switching unit 305*c* switches the H-V transposed signal to the vertical 8×1 IDCT unit 305*d* under a control of the picture controller 308, and the output signal of the transverse buffer 305*b* is inputted to the vertical 8×1 IDCT unit 305*d* through the switching unit 305*c* and is then 8×1 IDCT-ed in a vertical direction. The signal outputted from the vertical 8×1 IDCT unit 305*d* of the IDCT unit 305 is stored into the external memory through the MC unit 307 and the adder 306. In other words, the MPEG video signal performs the IDCT by 8×8 block unit according to an MPEG-2 syntax. At this point, in the case of an intra-picture (I-picture), the IQ/IDCT result is stored directly into the external memory, and in the case of P-picture or B-picture, the motion compensated block and the IDCT-ed result are added by the adder 306 and then stored into the external memory. Here, the motion compensated block is obtained using the motion information and the previous frame information stored in the external memory by means of the MC unit 307. The stored image is displayed on a screen through the video display processor (VDP).

Meanwhile, the video DIF signal outputted from the DV system decoder 202 is inputted to the VLD 302 through the buffer 301 of the combined DV/MPEG video decoder 204. The VLD 302 performs the variable length decoding to the output signal of the buffer 301. Then, the IQ 303 inversely quantizes the output of the VLD 302. Then, the output signal of the IQ 303 is sequentially stored into the external memory through the buffer 304, the IDCT unit 305, the adder 306 and the memory interface 208.

At this point, like the I-picture of the MPEG, the MC unit 307 is not needed because the DV format has only information on a still image, i.e., an intra frame. However, the VLD and IQ method for the DV format is different from that for the MPEG video. Therefore, the VLD and IQ must be modified for the processing of the DV format. For example, the VLD and the IQ can be configured separately for the MPEG video signal and the DV signal and can be shared by adjusting parameters of the picture controller 308. The picture controller 308 provides control/header information necessary for the video decoding to the blocks. The control/header information includes timing, flag, MPEG/DV recognition signal, and the like.

According to the present invention, the IDCT unit 305 further includes the switching unit 305*c* and the vertical 4×1 IDCT unit 305*e* for the 525-60 DV format. Also, the de-shuffler unit 309 is provided in the memory interface 208.

The above configuration is provided for supporting both the 4×8 IDCT with respect to the field DCT and the 8×8 IDCT with respect to the frame DCT in the macro block of the DV 525-60 system, as shown in FIG. 4A. For example, if the DV signal outputted from the DV system decoder 202 is the 525-60 DV format and is the field DCT in a vertical direction, the DV signal is 8×1 IDCT-ed in a horizontal direction by the horizontal 8×1 IDCT unit 305*d* of the IDCT unit 305, and the H-V transposed signal outputted from the transverse buffer 305*b* is transferred to the vertical 4×1 IDCT unit 305*e* through the switching unit 305*c* and is then 4×1 IDCT-ed in a vertical direction. If the DV signal is the frame DCT, the DV signal is outputted to the vertical 8×1 IDCT 305*d* and then 8×1 IDCT-ed in a vertical direction. Then, the 8×1 IDCT-ed signal is stored into the external memory through the adder 306.

Meanwhile, the 625-50 DV format is similar to the macro block of the MPEG video and supports only the 8×8 IDCT. In other words, if the signal outputted from the IQ 303 is the 625-50 DV format, the horizontally 8×1 IDCT-ed result of the horizontal IDCT unit 305*a* is H-V transposed in the transverse buffer 305*b*. Then, the H-V transposed signal is inputted to the vertical 8×1 IDCT unit 305*d* through the switching unit 305*c* and then 8×1 IDCT-ed in a vertical direction.

Figure 5:
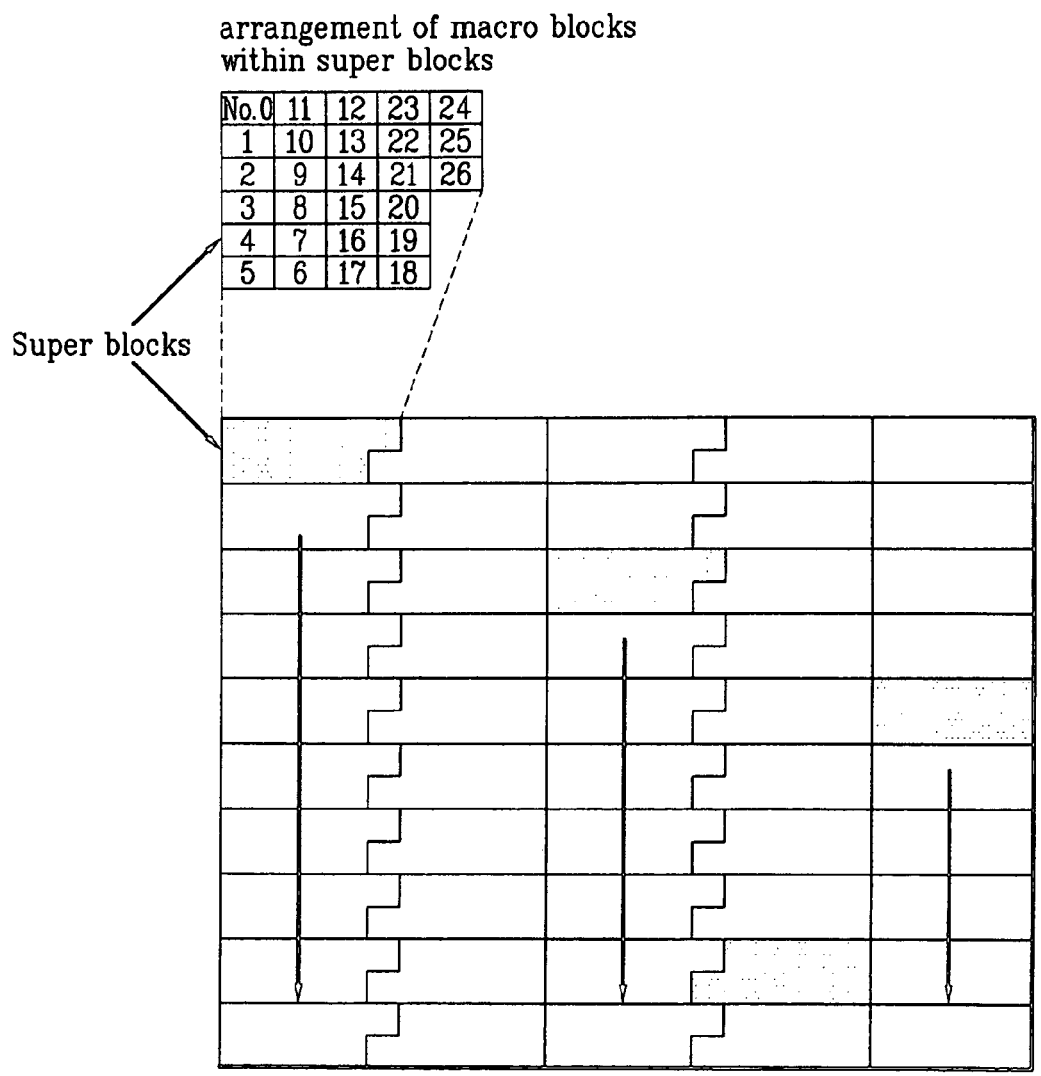
FIG. 5 exemplarily shows a frame structure of the DV 525-60 system.

FIG. 5 shows a frame structure of the DV 525-60 system. Referring to FIG. 5, in the case of the DV format, the signal is transmitted by supper block unit consisting of 27 adjacent macro blocks. The transmitted supper block is positioned randomly in a regular pattern within an external frame memory. In other words, the macro blocks transmitted like MPEG video are not positioned sequentially by slice unit and transmitted without being adjacent like the super block. Therefore, the de-shuffler 309 is needed for the reconfiguration of the original screen.

In the case of the video decoder according to the present invention, the decoding performance of the SD DV screen is sufficient under the performance of the HD MPEG video decoder.

Figure 6A:
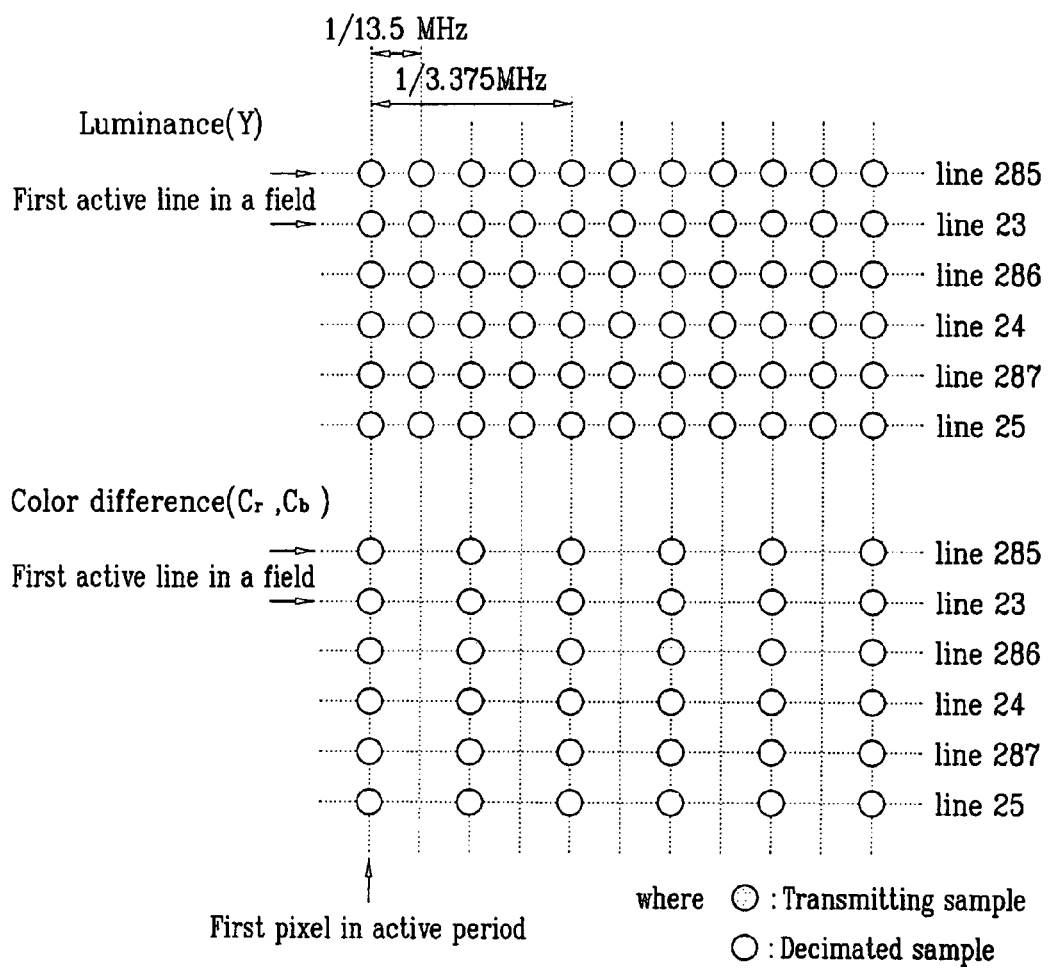
FIG. 6A shows a 4:1:1 sampling structure of the DV 525-60 stored in an external memory.
Figure 6B:
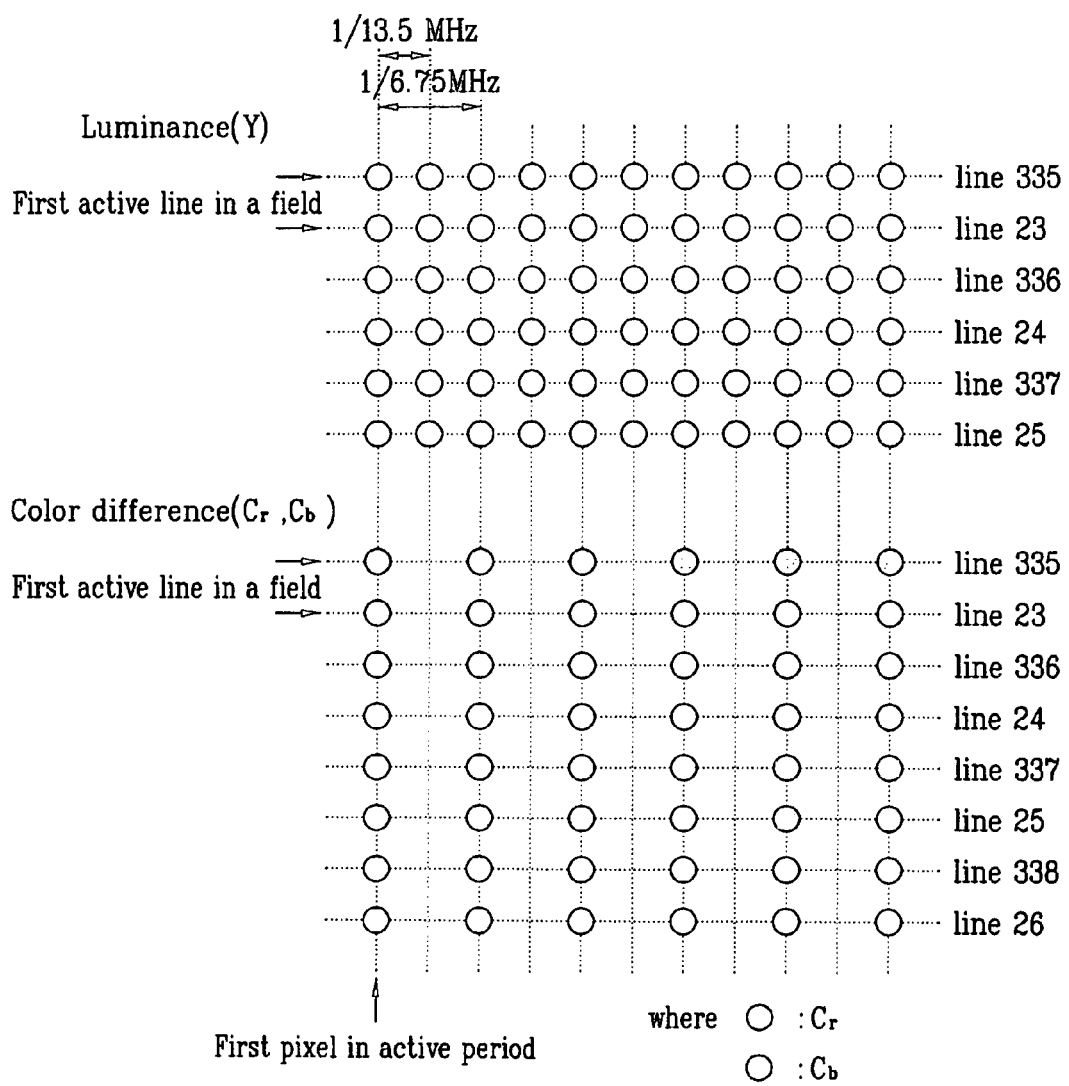
FIG. 6B shows a 4:2:0 sampling structure of the DV 625-50 system stored in an external memory.

FIGS. 6A and 6B show the sampling structures of the frame stored in the external memory through the de-shuffler 309. FIG. 6A shows a 4:1:1 sampling structure of the DV 525-60 DV format. As shown, one color difference (Cr, Cb) signal exists at every four pixel of a luminance (Y) signal adjacent in a horizontal direction. FIG. 6B shows a 4:2:0 sampling structure of the 625-50 DV format. As shown, one color difference (Cr, Cb) signal exists at every two pixels of a luminance signal (Y) in horizontal and vertical direction by field unit. It can be seen from FIG. 6B that the 625-50 DV format is identical to the 4:2:0 sampling structure of the MPEG video. On the other hand, as shown in FIG. 6A, the 525-60 DV format has the 4:1:1 sampling structure. Accordingly, in case the format converter 206 reads out data from the memory and performs a screen processing, an additional processing is necessary.

Figure 7:
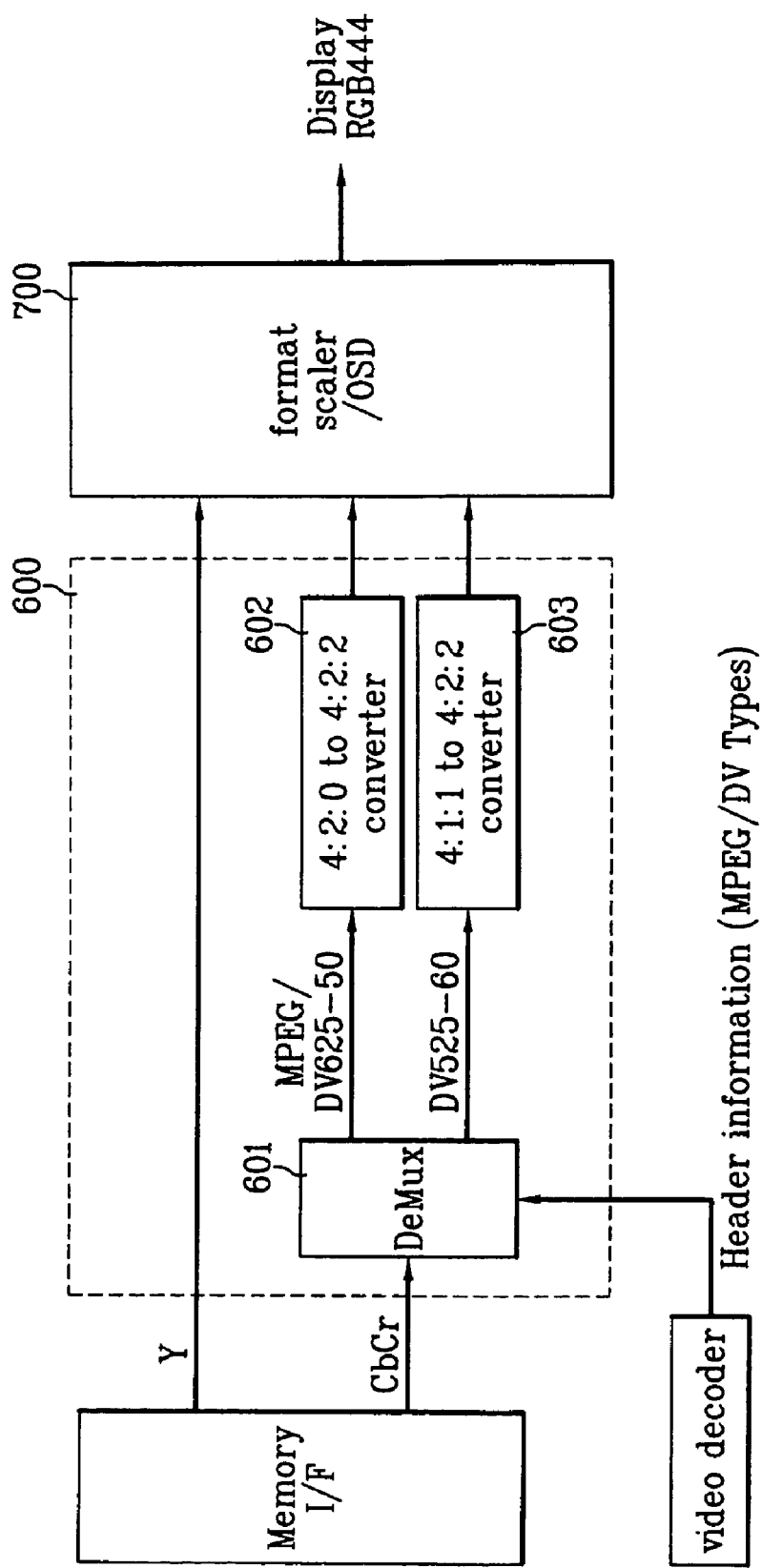
FIG. 7 is a detailed block diagram of the format converter shown in FIG. 2.

FIG. 7 is a detailed block diagram of the format converter 206 according to an embodiment of the present invention. FIG. 7 shows that the format converter 206 receives data from the combined DV/MPEG video decoder 204. However, actually, the data that is video-decoded by the combined DV/MPEG video decoder 204 is stored in the external memory through the memory interface 208, and the format converter 206 reads out the video-decoded data, which is stored in the external memory, through the memory interface 208 and performs the format conversion.

Referring to FIG. 7, a color conversion unit 600 is additionally provided at an input stage of a general format converter, i.e., a format scaler 700, thereby enabling the general format converter to perform the image processing of the DV format having the 4:1:1 pixel structure.

In other words, the luminance signal that is read out through the memory interface 208 is bypassed to the format scaler 700, and the color difference signal is converted into the 4:2:2 color difference format by the color conversion unit 600 and then outputted to the format scaler 700.

The color conversion unit 600 includes a demultiplexer (DeMux) 601, a first color difference format converter 602 and a second color difference format converter 603.

If the signal that is read out through the memory interface 208 is a color difference component, the demultiplexer 601 of the color conversion unit 601 selectively outputs the color signal, which is read out according to an MPEG/DV type signal outputted from the picture controller 308 of the video decoder 204, to one of the first and second color difference format converters 602 and 603. For example, if the MPEG/DV type is an MPEG or DV 625-50 type, the read-out color difference signal is outputted to the first color difference format converter 602, and if the MPEG/DV type is the DV 525-60 type, the read-out color difference signal is outputted to the second color difference format converter 603.

The first color difference format converter 602 receives the color difference signal of the 4:2:0 format from the demultiplexer 601, converts it into the color difference signal of the 4:2:2 format, and outputs the converted signal to the format scaler 700. The second color difference format converter 603 receives the color difference signal of the 4:1:1 format from the demultiplexer 601, converts it into the color difference signal of the 4:2:2 format, and outputs the converted signal to the format scaler 700. The format scaler 700 receives the luminance signal from the memory interface 208 and the color signal from the first or second color difference format converter 602 or 603, increase or decreases an aspect ratio according to the kinds of display-devices, and performs an on screen display (OSD) processing.

When the MPEG-2 decoder that is the digital video transmission standard is implemented with a chip, it is possible to decode both the HD MPEG format and the SD DV format by using one video decoder inside the chip. Here, the SD DV format is the digital camcorder transmission standard.

As described above, according to the MPEG video decoding system supporting the digital video format, both the HD MPEG sequence and the DV sequence can be decoded and displayed by sharing some blocks inside one video decoder. Therefore, it is very easy to decode and display the DV image inputted through the IEEE-1394 interface as well as the DTV images inputted through a tuner by using one video decoder. Compared with the conventional method in which the MPEG video decoder and the DV decoder are provided separately, the video decoding method of the present invention has an effect of a cost-down because the memory capacity and the chip size are reduced.

Specifically, the present invention is an essential basic technology in application fields, such as digital TV and settop box. The present invention can strengthen the technical competitiveness in the high performance video decoding chip supporting the digital camcorder and other companies' digital TVs.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An MPEG video decoding system, comprising:
   a buffer configured to store an MPEG-formatted video signal or a DV-formatted video signal and to output a corresponding buffer output signal;
   a VLD/IQ (Variable Length Decoder/Inverse Quantized) device configured to perform a variable length decoding and an inverse quantization to the buffer output signal so as to generate a VLD/IQ output signal;
   an IDCT (Inverse Discrete Cosine Transform) device configured to generate an IDCT transformed signal by
      performing an 8×8 IDCT transform on the VLD/IQ output signal if the VLD/IQ output signal is the MPEG-formatted video signal, and
      performing an 8×8 IDCT or a 4×8 IDCT transform on VLD/IQ output signal if VLD/IQ output signal is the DV-formatted video signal;
   an adder; and
   a motion compensator, wherein
      if the IDCT transformed signal is an MPEG-formatted I-picture or a DV format signal,
         the adder is configured to bypass and store the IDCT transformed signal into an external memory, and
      if the IDCT transformed signal is an MPEG-formatted P-picture or an MPEG-formatted B-picture
         the motion compensator is configured to
            generate a motion compensated signal by performing motion compensation on a current frame based on motion information and a previous frame stored in the external memory, and
            output the motion compensated signal to the adder, and the adder is configured to
            add the IDCT transformed signal and the motion compensated signal, and store the added signal into the external memory.

2. The MPEG video decoding system of claim 1, wherein the IDCT device includes:
   a horizontal 8×1 IDCT unit configured to generate a horizontally transformed IDCT signal by performing an 8×1 IDCT transform on the inversely quantized video signal in a horizontal direction;
   a transverse buffer configured to perform a horizontal-vertical transposition to the horizontally transformed IDCT signal and to output a corresponding transverse buffer output signal;
   a switching unit configured to control an output path of the signal outputted from the transverse buffer according to the format type of the inputted signal, and to output a corresponding switch output signal;
   a vertical 8×1 IDCT unit configured to perform an 8×1 IDCT transform on the switch output signal in a vertical direction; and
   a vertical 4×1 IDCT unit configured to perform a 4×1 IDCT transform on the switch output signal in a vertical direction.

3. The MPEG video decoding system of claim 2, wherein the format type of the inputted signal is one of
   an MPEG format,
   a vertical frame DCT of 625-50 DV format,
   a vertical frame DCT of 525-60 DV format, and
   a vertical field DCT of 525-60 DV format.

4. The MPEG video decoding system of claim 3, wherein
   if the format type of the inputted signal is the MPEG format, the vertical frame DCT of 625-50 DV format and the vertical frame DCT of 525-60 DV format, the switching unit is configured to output the transverse buffer output signal to the 8×1 IDCT unit, and
   if the format type of the inputted signal is the vertical field DCT of 525-60 DV format, the switching unit is configured to output the transverse buffer output signal to the 4×1 IDCT.

5. The MPEG video decoding system of claim 1, further Comprising:
   a format converter, wherein the format converter is configured to
      convert a video-decoded 4:2:0 color difference signal into a 4:2:2 color difference signal if the video-decoded signal is the MPEG format or a 625-50 DV format, and
      convert a video-decoded 4:1:1 color difference signal into a 4:2:2 color difference signal if the video-decoded signal is a 525-60 DV format.

6. The MPEG video decoding system of claim 1, further comprising:
   a de-shuffler, wherein if the video-decoded signal is a 525-60 DV format, the de-shuffler is configured to
      output the video-decoded signal as a super block unit comprising a plurality of macro blocks,
      deshuffle the video-decoded signal in order to reconfigure an original screen, and
      store the de-shuffled signal into the external memory.

7. An MPEG video decoding system including a memory interface for controlling data input/output between a video decoder and an external memory, the MPEG video decoding system comprising:
   an MPEG system decoder configured to divide an external input MPEG bitstream into a video bitstream and an audio bitstream, and to output a corresponding MPEG system decoder output signal;
   a DV (Digital Video) system decoder configured to convert an external input DV formatted signal into a DIF (Digital Interface Format) signal,
      divide the DIF signal into a video DIF and an audio DIF, and
      output a corresponding DV system decoder output signal;
   a single combined DV/MPEG video decoder configured to
      receive the MPEG system decoder output signal and the DV system decoder output signal as a DV/MPEG video decoder input signal,
      share a plurality of internal blocks to decode both the MPEG system decoder output signal and the DV system decoder output signal to generate decoded data, and
      store the decoded data into the external memory; and
   a format converter configured to perform a format conversion to generate a color difference signal, the color difference signal being a signal that is video-decoded by the combined DV/MPEG video decoder and outputted through the external memory,
   wherein the single combined DV/MPEG video decoder is further configured to
      perform an 8×8 IDCT if the DV/MPEG video decoder input signal is the MPEG system decoder output signal, and
      perform an 8×8 IDCT or a 4×8 IDCT if the DV/MPEG video decoder input signal is the DV system decoder output signal.

8. The MPEG video decoding system of claim 7, wherein the MPEG bitstream is inputted to the MPEG system decoder through a tuner, and the DV formatted signal is inputted to the DV system decoder through an IEEE-1394 interface.

9. The MPEG video decoding system of claim 7, wherein the combined DV/MPEG video decoder includes:
   a buffer configured to temporarily store and then output one of the MPEG system decoder output signal and the DV decoder output signal;
   a VLD/IQ device configured to perform a variable length decoding and an inverse quantization of the video signal outputted from the buffer;
   an IDCT device configured to generate an IDCT transformed signal by
      performing an 8×8 IDCT if the inversely quantized signal is an MPEG format or 625-50 DV format, and
      performing one of an 8×8 IDCT and a 4×8 IDCT according to a DCT type if the inversely quantized signal is a 525-60 DV format;
   an adder; and
   a motion compensator, wherein
      if the TDCT transformed signal is an MPEG-formatted I-picture or a DV format signal,
         the adder is configured to bypass and store the IDCT transformed signal into an external memory, and
      if the IDCT transformed signal is an MPEG-formatted P-picture or an MPEG-formatted B-picture
         the motion compensator is configured to
            generate a motion compensated signal by performing motion compensation on a current frame based on motion information and a previous frame stored in the external memory, and
            output the motion compensated signal to the adder, and the adder is configured to
            add the IDCT transformed signal and the motion compensated signal, and store the added signal into the external memory.

10. The MPEG video decoding system of claim 9, wherein the IDCT device includes:
  a horizontal 8×1 IDCT unit configured to generate a horizontally IDCT transformed signal by performing an 8×1 IDCT transform on the inversely quantized video signal in a horizontal direction;
  a transverse buffer configured to perform a horizontal-vertical transposition to the horizontally IDCT transformed signal and to output a corresponding transposed signal;
  a switching unit configured to control an output path of the transposed signal according to the format type of a switching unit input signal and to generate a corresponding switching unit output signal;
  a vertical 8×1 IDCT unit configured to perform an 8×1 IDCT transform on the switching unit output signal in a vertical direction to generate a vertically IDCT transformed signal; and
  a vertical 4×1 IDCT unit configured to perform a 4×1 IDCT transform on the vertically IDCT transformed signal.

11. The MPEG video decoding system of claim 10, wherein
  if the format type of the inputted signal is the MPEG format, a vertical frame DCT of 625-50 DV format and the vertical frame DCT of 525-60 DV format the switching unit is configured to output the transposed signal to the 8×1 IDCT unit, and
  if the format type of the inputted signal is a vertical field DCT of 525-60 DV format, the switching unit is configured to output the transposed signal to the 4×1 IDCT.

12. The MPEG video decoding system of claim 7, wherein the format converter is configured to
  convert a video-decoded 4:2:0 color difference signal into a 4:2:2 color difference signal if the video-decoded signal is the MPEG format or a 625-50 DV format, and
  convert a video-decoded 4:1:1 color difference signal into a 4:2:2 color difference signal if the video-decoded signal is a 525-60 DV format.

13. The MPEG video decoding system of claim 7, wherein if the video-decoded signal is a 525-60 DV format, the de-shuffler is configured to
  output the video-decoded signal by super block unit comprising a plurality of macro blocks,
  deshuffle the video-decoded signal in order to reconfigure an original screen, and
  store the de-shuffled signal into the external memory.

14. An MPEG video decoding method, comprising:
  outputting a buffered video signal, the buffered video signal being one of an MPEG-formatted video signal and a DV-formatted video signal;
  performing a variable length decoding and an inverse quantization on the output buffered video signal so as to generate a VLD/IQ output signal;
  generating an TDCT transformed signal by
    performing an 8×8 IDCT transform on the VLD/IQ output signal if the VLD/IQ output signal is the MPEG-formatted video signal, and
    performing an 8×8 IDCT or a 4×8 IDCT transform on the VLD/IQ output signal if the VLD/IQ output signal is the DV-formatted video signal;
  if the IDCT transformed signal is an MPEG-formatted I-picture or a DV format signal, bypassing and storing the IDCT transformed signal into an external memory; and
  if the IDCT transformed signal is an MPEG-formatted P-picture or an MPEG-formatted B-picture
    generating a motion compensated signal by performing motion compensation on a current frame based on motion information and a previous frame stored in the external memory, and
    adding the IDCT transformed signal and the motion compensated signal, and storing the added signal into the external memory.

15. An MPEG video decoding method for a system including a memory interface for controlling data input/output between a video decoder and an external memory, the MPEG video decoding method comprising:
  dividing an external input MPEG bitstream into a video bitstream and an audio bitstream and outputting a corresponding MPEG system decoder output signal to a single combined DV/MPEG video decoder;
  converting an external input DV formatted signal into a DIF (Digital Interface Format) signal, dividing the DIF signal into a video DIF and an audio DIF, and outputting a corresponding DV system decoder output signal to the single combined DV/MPEG video decoder;
  receiving an input signal into the single combined DV/MPEG video decoder, the input signal being the MPEG system decoder output signal and the DV system decoder output signal, generating decoded data by sharing a plurality of internal blocks of the single combined DV/MPEG video decoder to decode both the MPEG system decoder output signal and the DV system decoder output signal, and storing the decoded data into the external memory; and
  performing a format conversion to generate a color difference signal, the color difference signal being a signal that is video-decoded by the single combined DV/MPEG video decoder,
  wherein the step of generating decoded data comprises
    performing an 8×8 IDCT if the DV/MPEG video decoder input signal is the MPEG system decoder output signal, and
    performing an 8×8 IDCT or a 4×8 IDCT if the DV/MPEG video decoder input signal is the DV system decoder output signal.

* * * * *